2 Sheets—Sheet 1.

P. H. JACKSON.

FIRE-PROOF BUILDINGS.

No. 6,994. Reissued March 14, 1876.

Witnesses:

M. A. Van Namee

Inventor:

P. H. Jackson by his attorney T. S. Stetson

New York City

2 Sheets—Sheet 2.

P. H. JACKSON.

FIRE-PROOF BUILDINGS.

No. 6,994. Reissued March 14, 1876.

Witnesses

Arnold Hörmann.

Alf. C. Westbrook

Inventor:

P. H. Jackson by his atty F. L. Stetson

New York

UNITED STATES PATENT OFFICE.

PETER H. JACKSON, OF NEW YORK, N. Y.

IMPROVEMENT IN FIRE-PROOF BUILDINGS.

Specification forming part of Letters Patent No. 147,006, dated February 3, 1874; reissue No. 6,994, dated March 14, 1876; application filed June 26, 1874.

*To all whom it may concern:*

Be it known that I, PETER H. JACKSON, of New York city, in the State of New York, have invented certain Improvements relating to Fire-Proof Buildings, of which the following is a specification:

I prepare sheet-metal supports analogous to lathing, to be coated with plastering, and hold it with its attachments at a little distance from the main wall, through the medium of non-conducting pieces, which may be traversed by screws or analogous fastenings so small that but little heat will be conducted.

The lathing or plaster-supporting material is formed with corrugations extending in parallel lines with plane portions between them, and with large perforations peculiarly arranged relatively to the ridges or corrugated lines, so that the plaster, when applied in a soft state and forced inward through the perforations, will lie upon the upper surface of the corrugations and form strong holding-supports.

The following is a description of what I consider the best means of carrying out the invention.

The accompanying drawings form a part of this specification.

Figure 1:
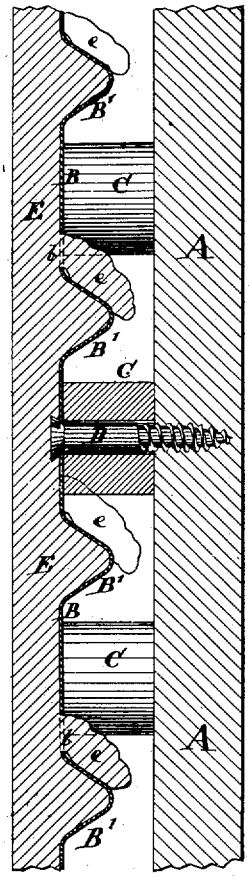
Figure 2:
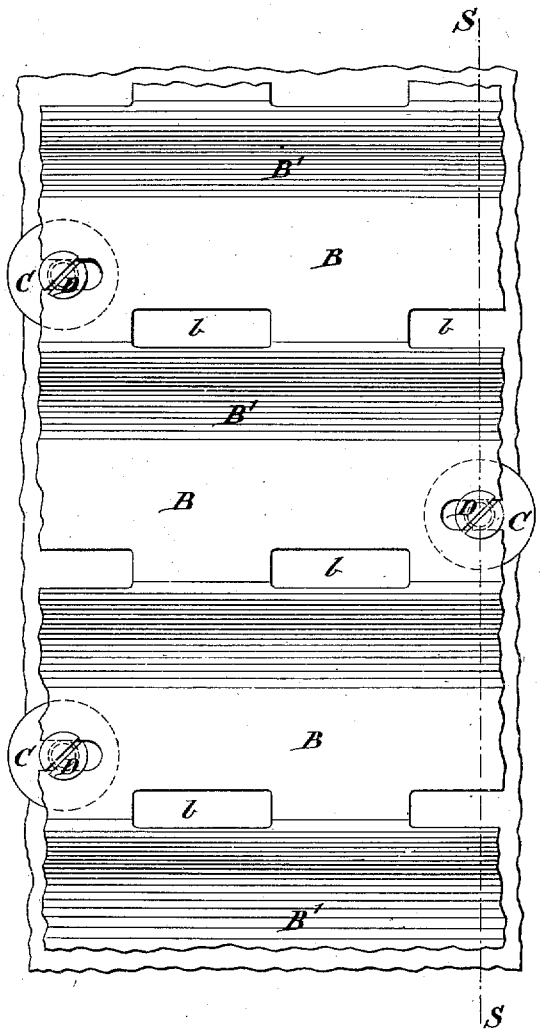
Figure 3:
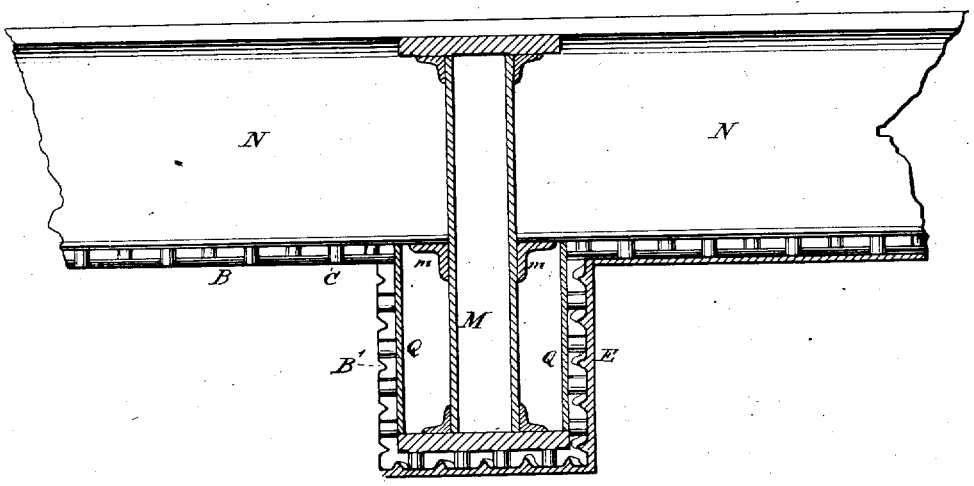
Figure 4:
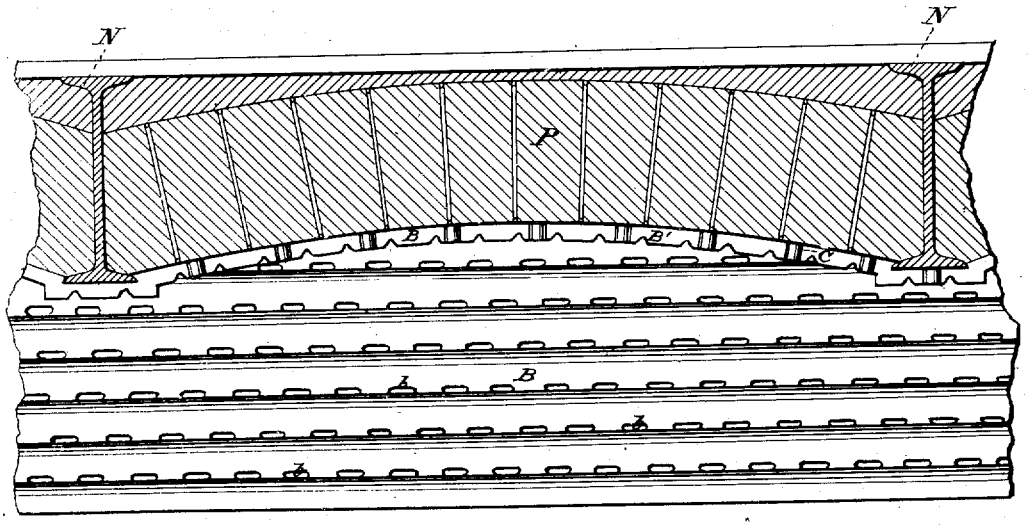

Figure 1 is a vertical section of a portion of a wall provided with my invention. Fig. 2 is a front face view of the lathing in place before the mortar is applied. The above represent the invention as applied to a plane vertical surface. The next two show it as applied to a ceiling, with deep girders exposed below the main surface. Fig. 3 is a vertical section in a plane across one of the girders, and Fig. 4 is a vertical section at right angles to the last.

Similar letters of reference indicate corresponding parts in all the figures.

Referring to Figs. 1 and 2, A is the inner face of the main exterior wall of the building, or one of the faces of a partition-wall. It may be of wood, prepared or not, or it may be of brick, iron, or any other material, preferably, of course, a material which will endure a high temperature. I will describe it as wood prepared by saturation with alum compounds, or with silicates or the like, so as to be tolerably incombustible.

Assuming that the same or other means are employed to defend against fire on the other side, (the right hand in the drawing,) I will confine the description to the means employed on the left side.

B is a sheet of rolled iron, preferably about No. 18, Birmingham gage; and B′ are V-shaped corrugations formed therein, with plane portions of the sheet metal between them. C is a non-conducting thimble or thick washer of soap-stone, clay, or other good non-conducting material; and D is an iron screw inserted through a hole in the metal B, and passing through the thimble C into the main wall A. Horizontal slots, instead of round holes, are made to receive the screws D. The depth of these slots should be only sufficient to receive the main body of the screw easily, but the length horizontally should be four or more times the diameter of the screw-shank. I produce apertures *b* in the plane portion of the metal B immediately above each V-shaped corrugation B′. E *e* is a thick coat of plastering or other non-conducting material, which is adapted to endure a high temperature, and is capable of being applied in a plastic condition. The sheet metal being properly fastened upon the wall through the medium of the screws and the non-conducting thimbles, the plastering E is applied from the exterior and forced through the apertures *b*, so as to lie upon the upper side of each corrugation B′, in the manner shown by *e*.

The material hardens in this condition, and the whole makes a fire-proof wall which is preferable to any before known to me, in some points of great importance. First, it allows a movement of air through the space between the plaster and the main wall, and will allow the use of wood without inducing its decay. This important point has been overlooked in some otherwise admirable fire-proof constructions, a wall otherwise very desirable having failed from the rapid decay of the tightly-incased wood. Second, the sheet-metal lathing and its connections may be heated highly before imparting any destructive temperature to the main wall. Third, the connection may be made very strong. Fourth, the sheet metal B B′ can expand and contract vertically by reason of its corrugations, and can expand and contract laterally by reason of the long holes in which the screws D are inserted.

In the application of my invention to ceilings where iron girders are employed, as shown in Figs. 3 and 4, M represents a box girder, and N N deep bars of rolled iron resting on shelves *m*, fixed at or near the half depth of the girder. The thin sheet metal B B′, with the perforations *b*, is attached through the intervention of the screws D and thimbles C, and made to support a coating of mortar or other non-conducting material applied in a plastic state, not only under the entire surfaces of the flat arches P, but also over the entire base and sides of that portion of the girder M which extends below such arches. The arches P may be of brick, supported by the flanges of the rolled iron N, and carrying a proper material above to form a fire-proof floor in the long-approved manner. The lower surfaces receive the fastenings D, which, in this case, may be nails driven in proper holes previously drilled in the brick, or there may be any other style of fastening adapted to secure the work firmly to such material. The fastenings D, which come directly below the iron N, may be screws tapped into the iron. In each case the washers or thimbles C are introduced and perform a useful function.

The importance of a protective ceiling to a fire-proof floor will be appreciated by those experienced in the construction of such work, and who have had opportunities for observing the effects of fire.

In order to apply the protection properly to that portion of the girder M which is below the shelves *m*, I tap holes for the fastenings D at suitable intervals in the lower chord of the girder, and there is no difficulty in thereby securing the perforated metal lathing B B′, and consequently the mortar E, over the whole under surface; then, to properly protect the sides, I add thin sheet metal in the position represented by Q Q in Fig. 3, and attach the protection thereto. This construction increases the apparent size of the girder a little, but does not seriously interfere with the architectural effect. The protection to the girder is unusually efficient by reason not only of the mortar E and of the space between the metal B B′ and the adjacent plate Q, but also of the liberal space between the plate Q and the sides of the girder proper. All these spaces increase the non-conducting defense against heat.

I claim as my invention—

1. The perforated sheet metal having plane portions B and ridges B′ adapted for matching against the thimbles C, and supporting the fastening E *e*, as herein specified.

2. The mortar E *e*, sheet metal B B′, non-conducting thimble C, and stout fastening D, arranged relatively to each other and to the wall or girder, as and for the purposes herein set forth.

PETER H. JACKSON.

Witnesses:

THOMAS DREW STETSON,
WM. C. DEY.